March 22, 1927.
J. A. CAMPO
COUPLING PIN
Filed Jan. 15, 1926
1,621,624
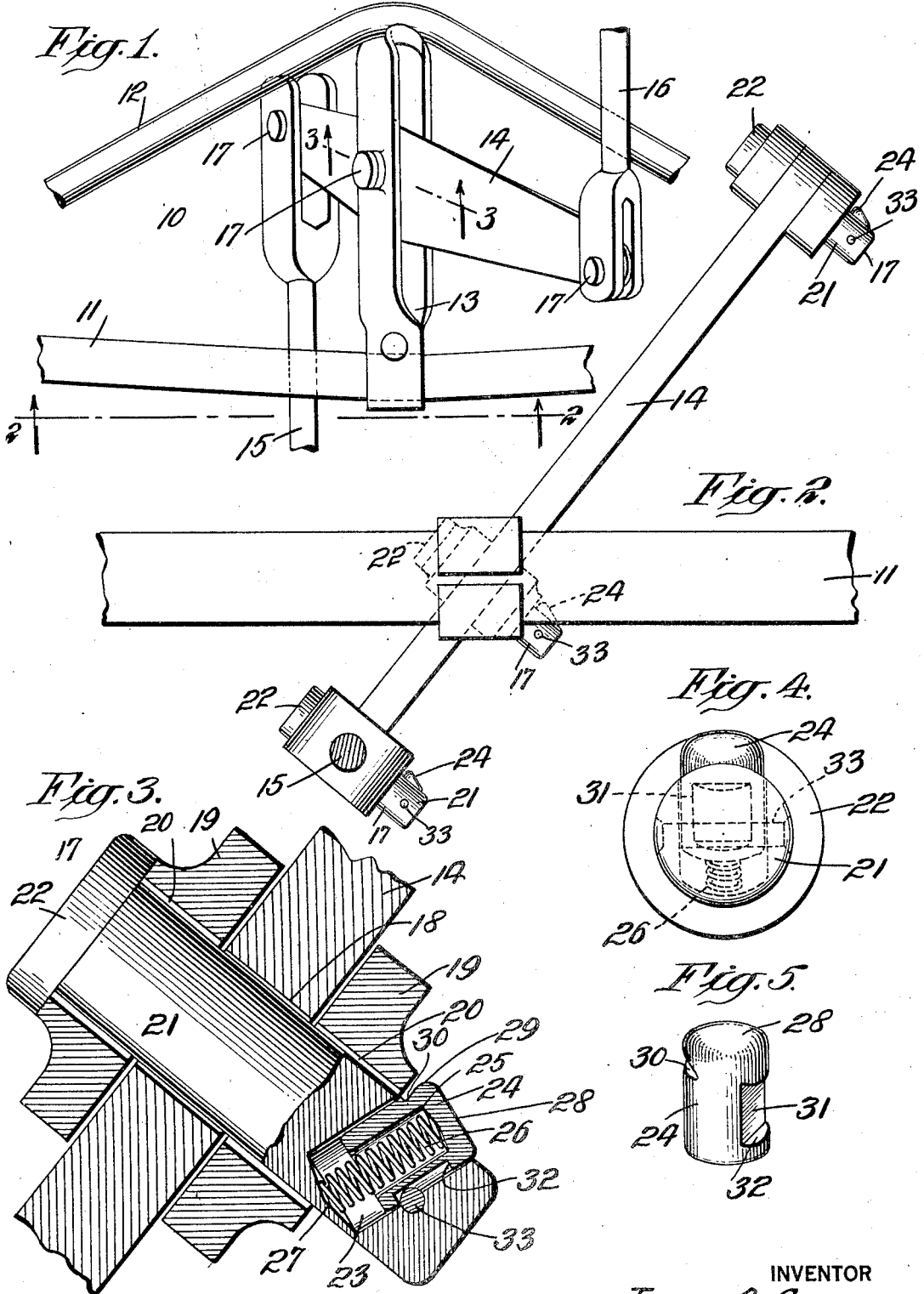
INVENTOR
JAMES A. CAMPO
BY
Geo. S. Wheelock
ATTORNEY Patented Mar. 22, 1927.

1,621,624

UNITED STATES PATENT OFFICE.

JAMES A. CAMPO, OF WOODRIDGE, NEW JERSEY, ASSIGNOR TO BUFFALO BRAKE BEAM COMPANY, A CORPORATION OF NEW YORK.

COUPLING PIN.

Application filed January 15, 1926. Serial No. 81,364.

This invention relates to improvements in coupling pins or bolts and has particular reference to self-locking coupling pins adapted for connecting levers, rods, links and the like of various mechanisms, particularly such as railway brake beams.

Prior to this invention parts of railway brake beam mechanisms have been connected together by cylindrical pins each having a flat head at one end and a transversely disposed cotter pin at the other end. Because of the constant jar and vibrations incident to use on railway cars, the cotter pins have frequently come out, followed by the loss of the coupling pin and resulting in disconnection of some of the parts. Such accidental displacement has been a great source of danger in railroad transportation work, and a great deal of effort has been directed to remedying the condition, several different forms of self-locking pins having been proposed. Some of the proposed self-locking pins have been impractical in structure, difficult and expensive to manufacture, or inconvenient in application, and one of the principal requirements in the solution of this problem is that the mechanism be confined within the limits of a standard size coupling pin.

An important object of the present invention is to provide a coupling pin with a yieldable keeper which will be automatically depressed as the pin is pushed through the aperture of a link lever or the like in making a connection.

Another object is to provide such a device which may be easily embodied in a coupling pin of standard size without sacrificing mechanical strength.

Another object is to provide such a device which will be simple in construction and durable in service, economical to manufacture, and an improvement in the art.

Other objects and advantages will be apparent from the following description when taken in connection with the accompanying drawings, wherein a preferred embodiment of the invention is shown by way of illustration.

In the drawings forming a part of this application, Figure 1 is a fragmentary top plan view of a brake beam mechanism equipped with self-locking pins embodying the invention;

Figure 2 is a longitudinal sectional view on the line 2—2 of Figure 1;

Figure 3 is an enlarged sectional view taken through one of the improved pins, the section being on the line 3—3 of Figure 1;

Figure 4 is an end elevation of the improved pin; and

Figure 5 is a detail perspective view of the keeper per se.

Referring particularly to Figures 1 and 2, it will be seen that the invention is illustrated as being applied to a brake beam mechanism wherein the reference character 10 designates a portion of the trussed brake beam, 11 the usual compression member, and 12 the trussed rod. A strut 13 is disposed between the compression member 11 and the trussed rod 12, in which is pivotally mounted a brake lever 14 having one of its ends connected to the lower connecting rod 15, and its other end attached to the usual power rod 16. My improved coupling pin forms the pivotal connections between the brake lever 14 and the strut 13, as well as to the rods 15 and 16, said coupling pins being designated generally by the reference character 17.

As best shown in Figure 3, the brake lever 14 is provided with an aperture 18 for the reception of the pin 17, while the side members 19 of the strut 13 are provided with aligning apertures 20 to support said pin. The pin 17 preferably comprises a cylindrical body portion 21 which is provided at one end with the usual head 22, and adjacent its other end with a recess 23 which may preferably be inclined and extending transversely with relation to the axis of the body portion 21. A keeper 24 is mounted for sliding movement within the recess 23, said keeper being preferably in the form of a cylindrical plunger which is centrally hollow, as at 25, for the reception of a coiled compression spring 26, which also engages the bottom 27 of the recess 23 to normally force the keeper 24 outwardly. The outer end 28 of the keeper 24 is thus inclined with relation to the axis of the body portion 21, so that its edge which is furthest away from the head 22 is substantially flush with the side of the body portion 21, while the opposite side of the plunger extends a substantial distance from the side of the body portion, as indicated at 29. The projecting side of the keeper 24 is notched as at 30, to provide a flat surface for contact with the outer side of the supporting member shown in Figure 3, as the side 19 of the strut.

One side of the keeper 24 is preferably formed with a transverse groove 31, which forms limiting shoulders 32 for cooperation with a key 33 to limit the movement of the plunger within the recess 23. The key 33 may preferably be in the form of a transversely extending rivet carried by the body portion 21 and extending partly within the recess 23, and the construction is such that the engagement of the side of the key 33 with the bottom of the groove 31 prevents rotation of the keeper in the recess, and in this manner the notch 30 is always maintained in its proper relationship.

In making use of the invention, it is merely necessary to align the openings 18 and 20 in the parts to be connected, after which the extremity of the body portion 21 is inserted and pushed through said openings. Since the outer end 28 of the keeper is inclined toward the side of the body portion 21, it will be obvious that, as the keeper reaches the entrance to the opening 20 it will be depressed by the cam action of the side walls of said opening, so that the body portion 21 may be completely positioned within the aligned openings. When movement of the pin is restricted by the head 22, the outer end of the keeper has passed completely through the openings and is forced outwardly from the side of the body portion by the action of the compression spring 27, and because of the fact that one side of the keeper projects beyond the body portion of the pin accidental return of the pin through the openings 18 and 20 will be impossible.

In order to withdraw the coupling pin to disconnect the brake lever, it will be necessary to manually depress the keeper 24 so that it can enter the opening 20, and such depression cannot be accomplished by vibration or jar such as brake beam mechanisms are subjected to.

From the foregoing, it will be evident that I have provided a self-locking coupling pin of extremely simple construction and relatively great mechanical strength, in such a manner that the yieldable keeper and associated parts may easily be applied to a coupling pin of standard size. The invention is of course susceptible of modification, and the right is herein reserved to make such changes as fall within the scope of the appended claims without departing from the spirit of the invention.

Having thus described my invention, what I claim is:

1. A coupling pin for railway equipment comprising a body portion having an enlarged head on one end and a recess adjacent its other end, a keeper reciprocable in the recess, the outer end of said keeper extending beyond the side of the body portion and inclined toward said side in a direction away from the head end, the high side of said keeper being notched to provide a flat surface for engagement with part of a mechanism to which the pin is applied, and a coil spring disposed between the plunger and the bottom of the recess.

2. A coupling pin for railway equipment comprising a body portion provided with in inclined recess adjacent its extremity, a keeper reciprocable within the recess, said keeper having its outer end inclined relatively to the side of the body portion so that one side of the keeper projects beyond the side of the pin while the opposite side of the keeper is substantially flush with said pin, a spring acting between the keeper and the bottom of the inclined recess, and means to limit the movement of the keeper, said limiting means also preventing rotation of the keeper.

3. In a coupling pin for railway equipment, a cylindrical body portion having a head on one end and an inclined recess adjacent its other end, a hollow cylindrical keeper slidable in the recess, the side of said keeper nearest to the head of the pin projecting a substantial distance beyond the side of the body portion, and the opposite side of the keeper being substantially flush with the side of the body portion, a coil spring extending from within the hollow keeper to the bottom of the inclined recess, and a key carried by the pin and extending partly within the recess to limit the movement of the keeper in either direction.

4. In a device of the character described, the combination with a cylindrical pin having a recess transverse to its axis, of a yieldable keeper formed from a hollow cylinder, said keeper being adapted to slide within the recess in the pin and being transversely grooved at one side to provide limiting shoulders, and a key carried by the pin and extending into said groove to limit the movement of the keeper and to prevent its rotation.

5. A coupling pin for railway equipment comprising a body portion having an enlarged head on one end and a recess adjacent its other end, a keeper reciprocable in the recess to enable the placement and removal of the pin, the outer end of said keeper extending beyond the side of the body portion and inclined toward said side in a direction away from the head end, the high side of said keeper being notched to provide a bearing surface, inclined to the axis of the keeper, for engagement with part of a mechanism to which the pin is applied, and a coil spring disposed between the plunger and the bottom of the recess.

JAMES A. CAMPO.